US005631412A

United States Patent [19]

Tomisawa

[11] Patent Number: 5,631,412

[45] Date of Patent: May 20, 1997

[54] APPARATUS AND METHOD FOR ESTIMATING ATMOSPHERIC PRESSURE IN AN INTERNAL COMBUSTION ENGINE

[75] Inventor: Naoki Tomisawa, Atsugi, Japan

[73] Assignee: Unisia Jecs Corporation, Kanagawa-ken, Japan

[21] Appl. No.: 583,407

[22] Filed: Jan. 5, 1996

[30] Foreign Application Priority Data

Jan. 6, 1995 [JP] Japan .................................... 7-000539

[51] Int. Cl.$^6$ ............................ G01M 19/00; G01M 5/00

[52] U.S. Cl. ............................................. 73/118.2; 73/116

[58] Field of Search ......................... 73/70, 118.2, 117.2, 73/117.3, 116

[56] References Cited

U.S. PATENT DOCUMENTS

| | | | |
|---|---|---|---|
| 3,913,398 | 10/1975 | Curtis | 73/152.33 |
| 4,495,921 | 1/1985 | Sawamoto | 123/438 |
| 5,003,950 | 4/1991 | Kato et al. | 73/118.2 |
| 5,012,422 | 4/1991 | Takashi et al. | 73/118.2 |
| 5,526,685 | 6/1996 | Davis | 73/262 |
| 5,532,930 | 7/1996 | Kako | 123/380 |

*Primary Examiner*—Richard Chilcot
*Assistant Examiner*—Max H. Noori
*Attorney, Agent, or Firm*—Lowe, Price, LeBlanc & Becker

[57] ABSTRACT

Engine intake air flow rate is detected as a mass flow rate, using a thermal type air flow meter, and engine intake air flow rate is also detected as a volumetric flow rate based on throttle valve opening and rotational speed. The mass flow rate is converted to volumetric flow rate based on the current intake air temperature, and a ratio of, the volumetric flow rate obtained by the conversion and the volumetric flow rate based on throttle opening and engine rotational speed is output as a value corresponding to atmospheric pressure.

14 Claims, 3 Drawing Sheets

APPARATUS AND METHOD FOR ESTIMATING ATMOSPHERIC PRESSURE IN AN INTERNAL COMBUSTION ENGINE

BACKGROUND OF THE INVENTION (1) Field of the Invention

The present invention relates to an apparatus and method for estimating atmospheric pressure in an internal combustion engine. In particular the invention relates to an apparatus and method for respectively detecting engine intake air flow rate as a mass flow rate and a volumetric flow rate, and then estimating atmospheric pressure (altitude) based on these flow rates and intake air temperature.

(2) Description of the Related Art

Conventionally with electronically controlled fuel injection units in internal combustion engines, it is known to respectively detect the mass flow rate of the intake air with a thermal type air flow meter, and the volumetric flow rate of the intake air based on throttle valve opening and engine rotational speed.

However, estimation of changes in atmospheric pressure (altitude) from mass flow rate detected with a thermal type air flow meter, and volumetric flow rate detected from throttle valve opening and engine rotational speed, has yet to be realized.

SUMMARY OF THE INVENTION

The present invention takes into consideration the above situation with the object of providing an atmospheric pressure estimation apparatus which can estimate stably atmospheric pressure (altitude) from mass flow rate detected with a thermal type air flow meter, and volumetric flow rate detected from throttle valve opening and engine rotational speed.

Moreover, it is an object of the invention to be able to carry out such atmospheric pressure estimation to a high accuracy, irrespective of differences in response time constant for various parameters.

To achieve the above objects, the apparatus and method for estimating atmospheric pressure in an internal combustion engine, according to the present invention includes; respectively detecting engine intake air flow rate as a mass flow rate and a volumetric flow rate, and convening the mass flow rate into volumetric flow rate based on engine intake air temperature, then computing a ratio of the volumetric flow rate obtained by said conversion and the intake air flow rate detected as a volumetric flow rate, and estimating atmospheric pressure based on this ratio, and outputting an atmospheric pressure signal.

With such a construction, since the intake air flow rate detected as a volumetric flow rate, and the intake air flow rate detected as a mass flow rate are compared, after eliminating the influence from temperature which together with the atmospheric pressure is a cause of changes in air density, then the atmospheric pressure can be estimated to high accuracy.

Here the engine intake air flow rate may be detected as a volumetric flow rate, based on engine throttle opening and engine rotational speed.

With such a construction, the intake air flow rate can be simply detected as a volumetric flow rate without using a volumetric flow rate meter, by respectively detecting the throttle opening and the engine rotational speed.

The mass flow rate may be weighted averaged prior to converting to volumetric flow rate based on the intake air temperature.

More specifically, by weighted averaging the mass flow rate, it is possible to absorb differences in detection response time constants related to intake air temperature.

Moreover, the intake air flow rate detected as a volumetric flow rate may be weighted averaged prior to computing the ratio thereof relative to the volumetric flow rate obtained by conversion of the mass flow rate.

In this way, it is possible to absorb differences in detection response time constants for the volumetric flow rate determined by converting the mass flow rate, and the intake air flow rate detected as a volumetric flow rate.

Moreover, the response time constants for the mass flow rate and the intake air temperature may be made equal prior to converting the mass flow rate to the volumetric flow rate based on the intake air temperature.

That is to say, if the response time constants for the mass flow rate and the intake air temperature are made equal, for example by the before mentioned weighted averaging process, then the conversion to eliminate the influence from intake air temperature can be carried out to a high accuracy.

Here the construction may be such that the engine intake air flow rate is detected as a mass flow rate, based on a resistance change of a thermosensitive resistor corresponding to intake air flow rate.

With such a construction, since the resistance of a thermosensitive resistor disposed in the intake air passage will drop with an increase in the intake air flow rate and the consequent drop in temperature, then the intake air flow rate can be detected as a mass flow rate, based on this resistance change.

Moreover, the volumetric flow rate obtained by conversion of the mass flow rate, and the intake air flow rate detected as a volumetric flow rate, may be respectively weighted averaged prior to obtaining the ratio thereof, to give a previously set maximum allowable time constant.

With such a construction, since the atmospheric pressure is estimated after weighted averaging to give the maximum allowable time constant, the atmospheric pressure estimation value can be stabilized to a value which approximates an actual value.

Here the maximum allowable time constant may be determined beforehand based on, an atmospheric pressure change rate at the time of a maximum expected road surface gradient and maximum speed, and the required resolving power for the atmospheric pressure estimation.

With such a construction, it is possible to stabilize the atmospheric pressure estimated value to the maximum limit, while maintaining the required resolving power for the atmospheric pressure estimation.

Other objects and aspects of the present invention will become apparent from the following description of an embodiment given in conjunction with the appended drawings.

DETAILED DESCRIPTION OF A PREFERRED EMBODIMENT

Figure 1:
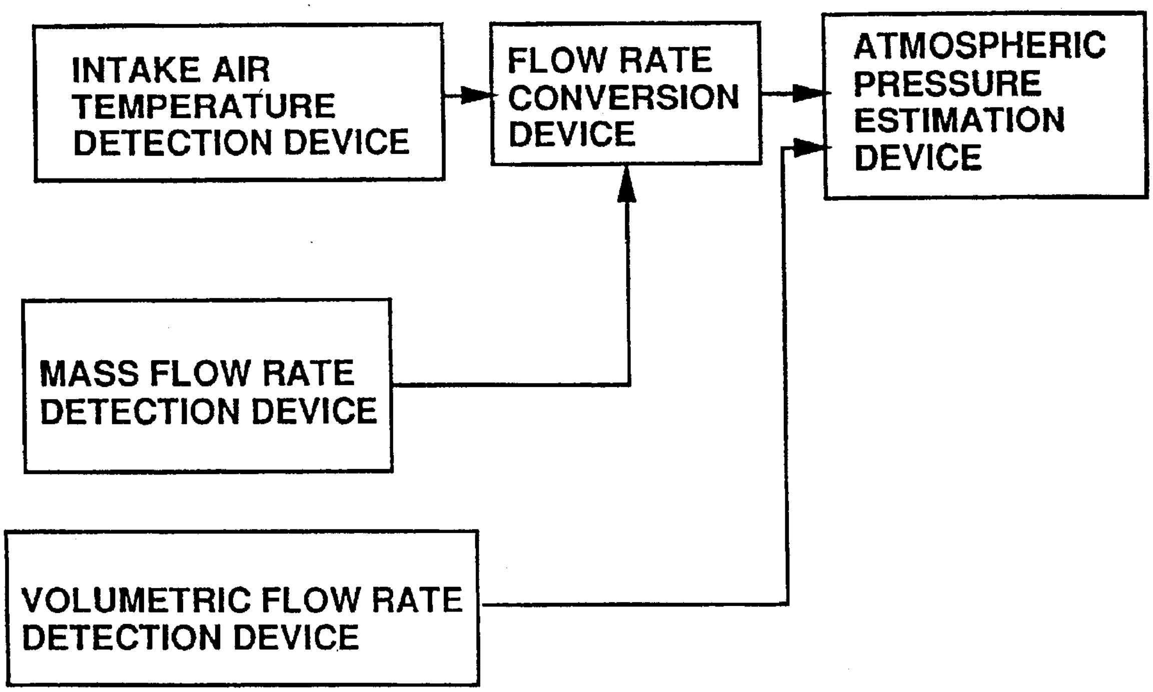
FIG. 1 is a block diagram showing a basic arrangement of an atmospheric pressure estimation apparatus according to the present invention.

FIG. 1 is a block diagram showing a basic arrangement of an atmospheric pressure estimation apparatus according to the present invention. A mass flow rate detection device detects an engine intake air flow rate as a mass flow rate, while a volumetric flow rate detection device detects an engine intake air flow rate as a volumetric flow rate. Moreover, an intake air temperature detection device detects engine intake air temperature. A flow rate conversion device converts the intake air flow rate detected as a mass flow rate, into a volumetric flow rate, based on the current intake air temperature. An atmospheric pressure estimation device then estimates atmospheric pressure, based on the volumetric flow rate obtained by the flow rate conversion device, and the volumetric flow rate detected by the volumetric flow rate detection device, and outputs an atmospheric pressure signal.

A basic embodiment of an apparatus and method for estimating atmospheric pressure, having the above mentioned basic construction will now be described.

Figure 2:
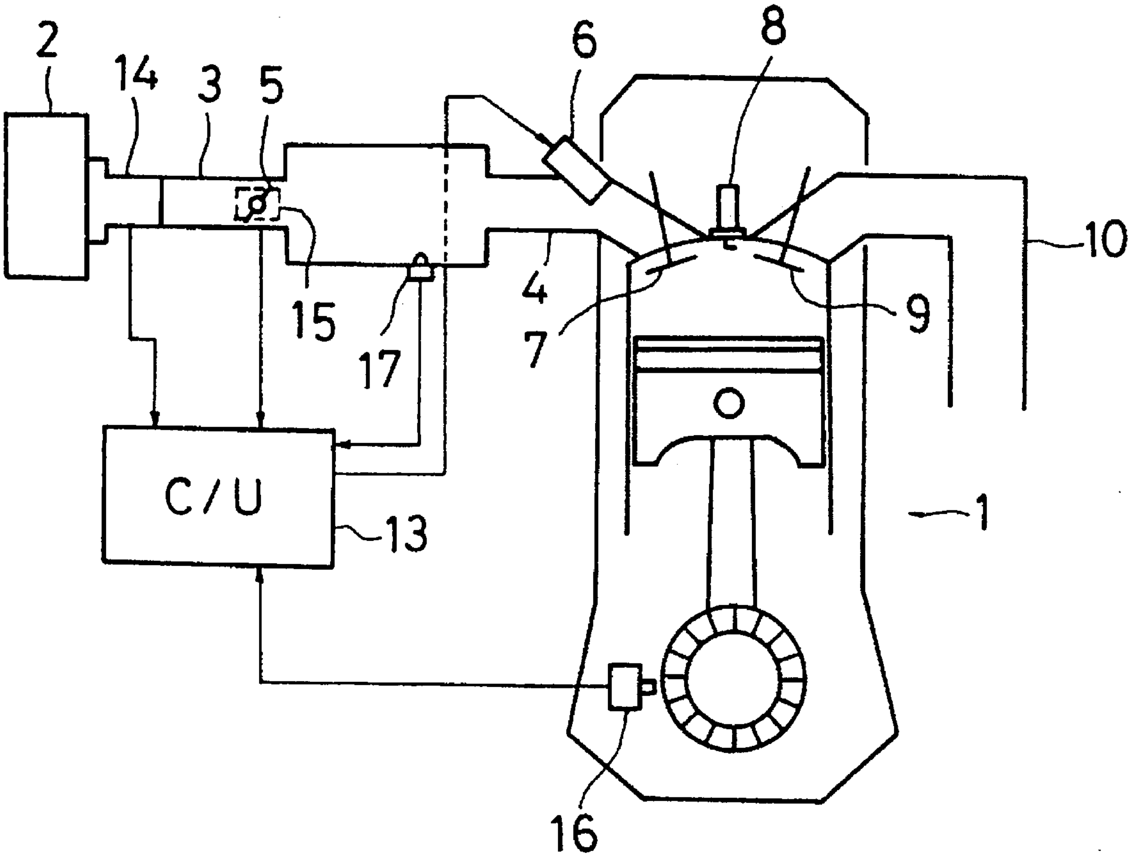
FIG. 2 is a schematic system diagram showing an embodiment of the present invention.

In FIG. 2 showing a system structure of the embodiment, an internal combustion engine 1 draws in air by way of an air cleaner 2, an intake duct 3, and an intake manifold 4.

A butterfly type throttle valve 5 connected to an accelerator pedal (not shown) is disposed in the intake duct 3, for adjusting the engine intake air flow quantity.

Solenoid type fuel injection valves 6 for each cylinder, are provided in respective branch portions of the intake manifold 4. A mixture of a predetermined air-fuel ratio is produced by electronic control of the fuel quantity injected from the fuel injection valves 6. The mixture which is drawn into the cylinder by way of an intake valve 7, is ignited by a spark from an ignition plug 8, and exhaust gas discharged via an exhaust valve 9, out through an exhaust manifold 10, to a catalytic converter and muffler (not shown).

A control unit 13 incorporating a microcomputer, for controlling the fuel injection valves 6, has input thereto, an intake air flow rate signal Qa from a hot wire type air flow meter 14, a throttle valve opening signal TVO from a throttle sensor 15, and a crank angle signal (engine rotation signal) from a crank angle sensor 16.

The hot wire type air flow meter 14 which corresponds to the mass flow rate detection device of the present embodiment, directly detects the engine 1 intake air flow rate as a mass flow rate, based on a resistance change of a thermosensitive resistor due to the intake air quantity.

The throttle sensor 15 detects the opening TVO of the throttle valve 5, using a potentiometer.

The crank angle sensor 16 takes out from a cam shaft or the like, a reference angle signal for each predetermined reference crank angle position, and a unit crank angle signal for each unit crank angle. The engine rotational speed Ne is then computed based on the generation period of the reference crank angle signal, or the number of generations of the unit crank angle signal within a predetermined time.

Fuel injection quantity control by the control unit 13 is carried out as follows.

A basic fuel injection quantity Tp (=K×Qa/Ne: where K is a constant) is computed based on the intake air flow rate Qa detected by the hot wire type air flow meter 14, and the engine rotational speed Ne computed based on the detection signal from the crank angle sensor 16. A correction corresponding to running conditions such as cooling water temperature, is then applied to the basic fuel injection quantity Tp, to obtain a final fuel injection quantity Ti. A drive pulse signal of a pulse width corresponding to the fuel injection quantity Ti is then output at a predetermined timing to the fuel injection valves 6. Fuel which has been regulated to a predetermined pressure by means of a pressure regulator (not shown), is supplied to the fuel injection valves 6, to thereby inject an amount of fuel proportional to the pulse width of the drive pulse signal.

Figure 3:
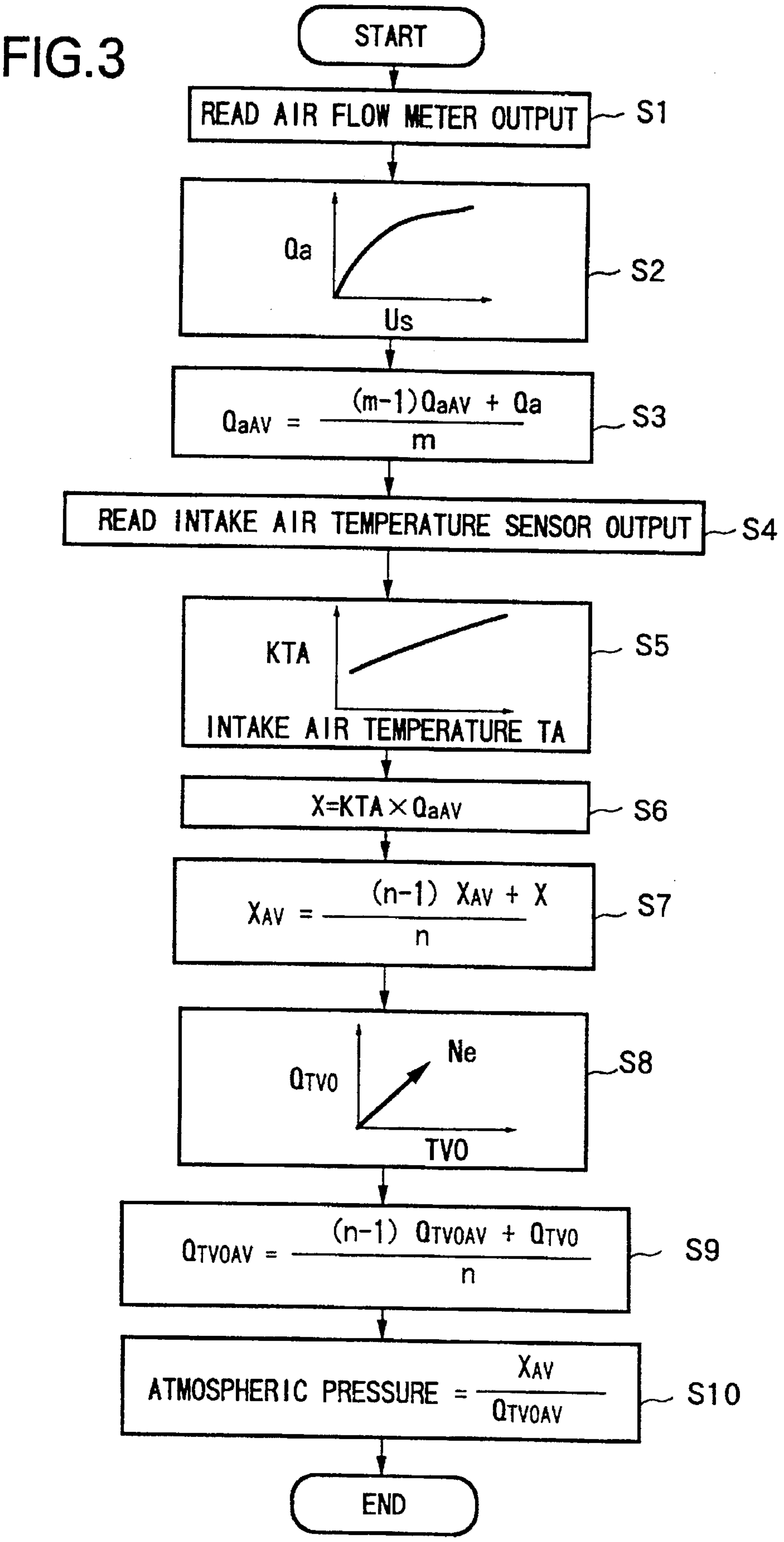
FIG. 3 is a flow chart showing aspects of an atmospheric pressure estimation routine, according to the embodiment.

The control unit 13 of the present embodiment has the function of controlling atmospheric pressure (altitude) estimation as illustrated by the flow chart of FIG. 3. In order to carry out atmospheric pressure estimation, an intake air temperature sensor 17 (intake air temperature detection device) for detecting intake air temperature TA, is provided in a collector portion of the intake manifold 4.

Aspects of the atmospheric pressure (attitude) estimation will now be described in detail, following the flow chart of FIG. 3.

Initially in step 1 (with "step" denoted by S in the figures), an output signal Us from the hot wire type air flow meter 14 is A/D converted and read. Then in step 2, the output signal Us is converted to a mass flow rate Qa using a conversion table.

In step 3 (first weighted averaging device) a weighted average value QaAv of the mass flow rate Qa is computed according to the following equation:

$$Qa_{AV}=\{(m-1)Qa\}/m$$

Here the weighting constant m used in the weighted averaging, is set beforehand so that the time constant for the weighted average value $Qa_{AV}$ coincides with the response time constant for the intake air temperature TA detected by the intake air temperature sensor 17.

The intake air temperature sensor 17 for detecting the intake air temperature TA, generally has a response time constant in units of several seconds due to its thermal capacity, whereas the hot wire type air flow meter 14 for detecting the mass flow rate Qa, generally has a shorter time constant than that for the intake air temperature TA. Hence the phases of changes in intake air temperature TA and mass flow rate Qa do not coincide. The mass flow rate Qa is therefore weighted averaged so as to coincide with the time constant for the intake air temperature TA, and thus make the phases of the changes coincide.

In step 4, the output signal from the intake air temperature sensor 17 is A/D converted and read.

In step 5, the read output signal from the intake air temperature sensor 17 is converted to a coefficient KTA for converting the mass flow rate Qa into a volumetric flow rate.

In step 6 (flow rate conversion device), the mass flow rate $Qa_{AV}$ which has been subjected to the above described weighted averaging, is multiplied by the coefficient KTA, to convert the mass flow rate $Qa_{AV}$ into a volumetric flow rate (the volumetric flow rate for the reference temperature), which is set to X($X=KTA\times Qa_{AV}$).

In step 7 (second weighted averaging device), a weighted average value $X_{AV}$ of the volumetric flow rate X obtained in step 6, is computed according to the following equation:

$$X_{AV}=\{(n-1)X_{AV}+X\}/n$$

Here the weighting constant n used in the weighted averaging, is set beforehand so as to give a maximum allowable time constant (in general a time constant in units of minutes) obtained from a correlation of, atmospheric pressure (altitude) change rate for the case of ascent/descent of the maximum road surface gradient predicted for the topography at a predetermined maximum speed (for example 100 km/h), and the desired atmospheric pressure resolving power. More specifically, since even at the time of the maximum predicted atmospheric pressure change rate in practice, there is no problem as long as there is a time constant to obtain the predetermined atmospheric pressure (altitude) resolving power, then n can be set so that the weighted averaging gives a maximum allowable time constant in order to stabilize the atmospheric pressure estimation value.

In step 8 (volumetric flow rate detection device), the map in which the volumetric flow rate $Q_{TVO}$ has been previously stored corresponding to throttle opening TVO and engine rotational speed Ne, is referred to and the volumetric flow rate $Q_{TVO}$ corresponding to the current throttle opening TVO and engine rotational speed Ne retrieved.

In step 9 (second weighted averaging device), a weighted average value $Q_{TVO\ AV}$ of the volumetric flow rate $Q_{TVO}$ obtained in step 8, is computed according to the following equation:

$$Q_{TVO\ AV}=\{(n-1)Q_{TVO\ AV}+Q_{TVO}\}/n.$$

The weighting constant n used in the above weighted averaging computation is the same as the value used in step 7. With the volumetric flow rate $Q_{TVO}$ also, this is weighted averaged to give the maximum allowable time constant.

In step 10 (atmospheric pressure estimation device), the ratio of, the volumetric flow rate $X_{AV}$ obtained by converting the mass flow rate $Qa_{AV}$ on the basis of intake air temperature TA, and the weighted average value $Q_{TVO\ AV}$ of the volumetric flow rate obtained from the throttle opening TVO and the engine rotational speed Ne is computed. The atmospheric pressure is then estimated, the computed result being a value corresponding to the atmospheric pressure (atmospheric pressure corresponding value $=X_{AV}/Q_{TVO\ AV}$), and an estimated atmospheric pressure signal is output.

Here the volumetric flow rates $X_{AV}$, and $Q_{TVO\ AV}$, are values which have been respectively weighted averaged so as to give the maximum allowable time constant. The atmospheric pressure estimation value can therefore be stabilized while maintaining the necessary resolving power, so that estimation results of a high reliability can be provided.

Now in the above embodiment, the volumetric flow rate is detected based on the throttle opening TVO and the engine rotational speed Ne. However in the case where an auxiliary air path for bypassing the throttle valve is provided, then the volumetric flow rate may be obtained by adding the opening area of the auxiliary air path to the throttle valve opening.

Although the present invention has been described and illustrated in detail, it should be clearly understood that the same is by way of illustration and example only and is not to be taken by way of limitation, the spirit and scope of the present invention being limited only by the terms of the appended claims.

I claim:

1. An apparatus for estimating atmospheric pressure in an internal combustion engine, comprising:

mass flow rate detection means for detecting engine intake air flow rate as a mass flow rate;

volumetric flow rate detection means for detecting engine intake air flow rate as a volumetric flow rate;

intake air temperature detection means for detecting engine intake air temperature, flow rate conversion means for converting said mass flow rate into a volumetric flow rate based on said intake air temperature; and atmospheric pressure estimation means for estimating atmospheric pressure based on a ratio of, the volumetric flow rate obtained by conversion with said flow rate conversion means, and the volumetric flow rate detected by said volumetric flow rate detection means, and outputting an atmospheric pressure signal, wherein said atmospheric pressure estimation means respectively weighted averages the volumetric flow rate obtained by conversion with said flow rate conversion means, and the volumetric flow rate detected by said flow rate detection means, prior to obtaining the ratio thereof to five a previously set maximum allowable time constant.

2. An apparatus for estimating atmospheric pressure in an internal combustion engine according to claim 1, wherein said volumetric flow rate detection means detects volumetric flow rate, based on engine throttle opening and engine rotational speed.

3. An apparatus for estimating atmospheric pressure in an internal combustion engine according to claim 1, wherein a first weighted averaging means is provided for weighted averaging said volumetric flow rate prior to outputting to said flow rate conversion means.

4. An apparatus for estimating atmospheric pressure in an internal combustion engine according to claim 1, wherein a second weighted averaging means is provided for weighted averaging said volumetric flow rate detected by said volumetric flow rate detection means, prior to outputting to said atmospheric pressure estimation means.

5. An apparatus for estimating atmospheric pressure in an internal combustion engine according to claim 1, wherein response time constants for said mass flow rate and said intake air temperature are made equal, prior to carrying out conversion by said flow rate conversion means.

6. An apparatus for estimating atmospheric pressure in an internal combustion engine according to claim 1, wherein said mass flow rate detection means detects the engine intake air flow rate as a mass flow rate, based on a resistance change of a thermosensitive resistor corresponding to intake air flow rate.

7. An apparatus for estimating atmospheric pressure in an internal combustion engine according to claim 1, wherein said maximum allowable time constant is determined beforehand based on, an atmospheric pressure change rate at the time of a maximum expected road surface gradient and maximum speed, and a required resolving power for the atmospheric pressure estimation.

8. A method for estimating atmospheric pressure in an internal combustion engine, including; respectively detecting engine intake air flow rate as a mass flow rate and volumetric flow rate, and converting the mass flow rate into a volumetric flow rate based on engine intake air temperature, then estimating atmospheric pressure based on a ratio of, the volumetric flow rate obtained by said conversion and the intake air flow rate detected as a volumetric flow rate, and outputting an atmospheric pressure signal, wherein said volumetric flow rate obtained by conversion of said mass flow rate, and the intake air flow rate detected as volumetric flow rate, are respectively weighted averaqed, prior to obtaining the ratio thereof to give a previously set maximum allowable time constant.

9. A method for estimating atmospheric pressure in an internal combustion engine, according to claim 8, wherein said maximum allowable time constant is determined beforehand based on, an atmospheric pressure change rate at the time of a maximum expected road surface gradient and maximum speed, and a required resolving power for the atmospheric pressure estimation.

10. A method for estimating atmospheric pressure in an internal combustion engine, according to claim 8, wherein the engine intake air flow rate is detected as a volumetric flow rate, based on engine throttle opening and engine rotational speed.

11. A method for estimating atmospheric pressure in an internal combustion engine, according to claim 8, wherein said mass flow rate is weighted averaged prior to converting to a volumetric flow rate based on said intake air temperature.

12. A method for estimating atmospheric pressure in an internal combustion engine, according to claim 8, wherein the intake air flow rate detected as a volumetric flow rate is weighted averaged prior to computing the ratio thereof relative to the volumetric flow rate obtained by conversion of the mass flow rate.

13. A method for estimating atmospheric pressure in an internal combustion engine, according to claim 8, wherein response time constants for said mass flow rate and said intake air temperature are made equal prior to converting said mass flow rate to a volumetric flow rate based on the intake air temperature.

14. A method for estimating atmospheric pressure in an internal combustion engine, according to claim 8, wherein said engine intake air flow rate is detected as a mass flow rate, based on a resistance change of a thermosensitive resistor corresponding to intake air flow rate.

* * * * *